Patented Oct. 14, 1930

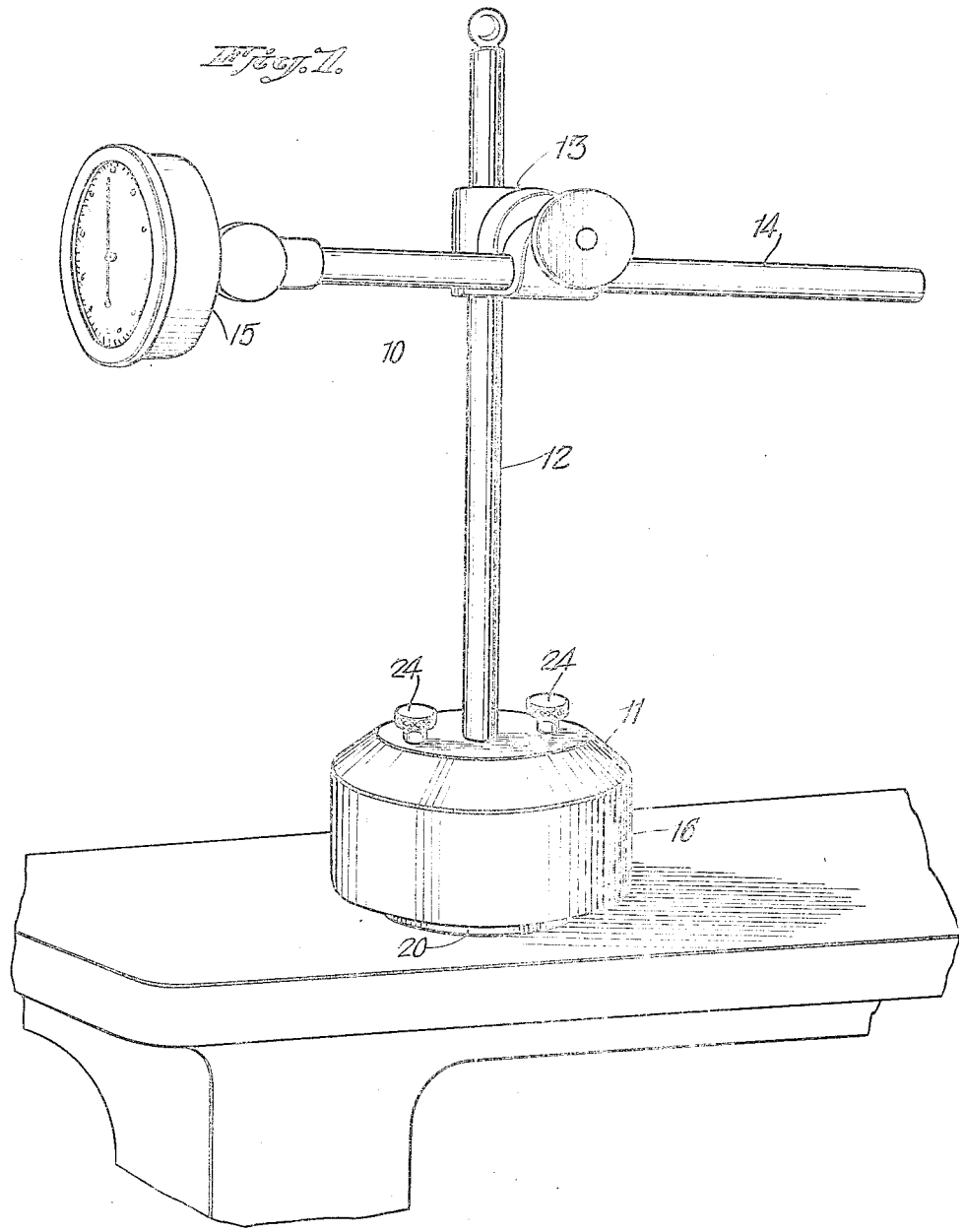

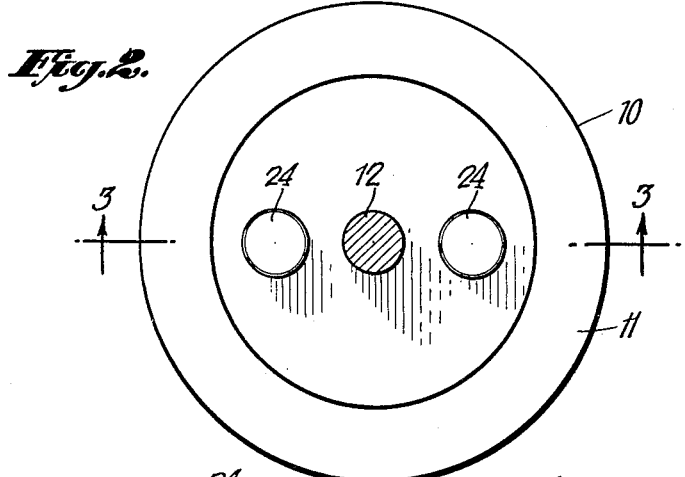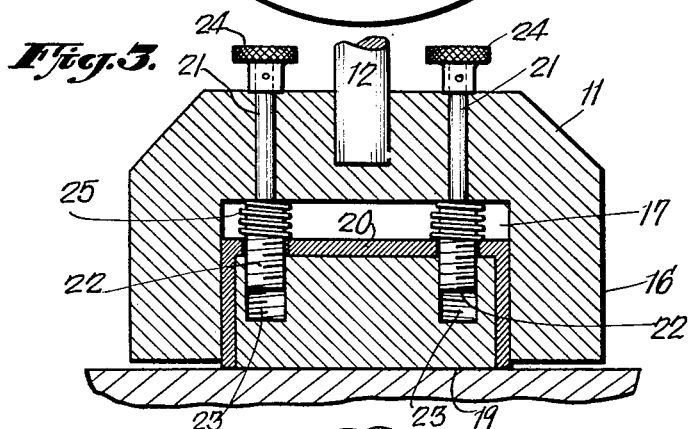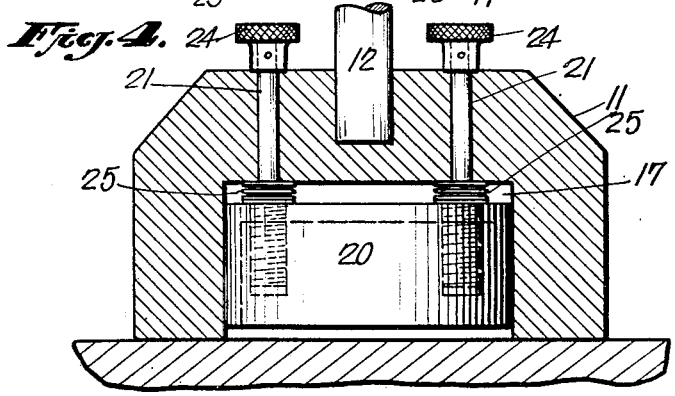

1,778,481

UNITED STATES PATENT OFFICE

LEO P. BOUCHER, OF BRISTOL, CONNECTICUT

DIAL-TEST INDICATOR

Application filed October 11, 1929. Serial No. 398,932.

This invention relates to improvements in dial test indicators and more particularly to a base therefor.

The primary object of the invention resides in a test indicator for use in connection with the testing of surfaces for out-of-roundness and for other purposes well known to which such device may be used. However, in the use of the indicator, it is sometimes desirable to freely apply the face of the instrument over the surface to be tested, while other times it is desired to apply the base to the surface so as to remain stationary thereon. Therefore, the main purpose of this invention is the provision of a base which may be adjusted for sliding movements over the work or stationary connection therewith.

Another object is the provision of a test indicator base provided with an adjustable magnetized block which may be retracted to a position within the base so as not to contact with the work to be tested, or moved to an extended position beyond the base to engage the work so that the magnetic action between the block and the work will support the instrument in a fixed position to allow the operator free use of both hands in checking up the indicator or for any other purpose desired.

With these and other objects in view, the invention resides in the certain novel construction, combination and arrangement of parts, the essential features of which are hereinafter fully described and, are particularly pointed out in the appended claims, and illustrated in the accompanying drawing in which, Figure 1 is a perspective view of a dial test indicator equipped with my improved base and showing the same in use.

Figure 2 is a top plan view of the base and showing the indicator support in cross section.

Figure 3 is a vertical sectional view on the line 3—3 of Figure 2.

Figure 4 is a view similar to Figure 3 but showing the magnetized block in a retracted position.

Referring more particularly to the drawing, the reference character 10 designates a test indicator in its entirety and which includes an improved base 11 from which a vertical post or standard 12 rises, and on which post an adjustable bracket 13 is slidably mounted, the said bracket adjustably supporting a shank 14 on one end of which the indicating instrument or dial 15 is mounted. Instruments of this kind are now in use for the purpose of testing cam shafts for out-of-roundness and for setting crank shafts in grinding machines, for accurately setting a fly-wheel in the lathe preparatory to turning off the old gear teeth when a new gear ring is to be put on, and various other uses. The invention in this instance, relates to the base 11 which will now be fully described.

The base 11 includes a non-magnetizable body 16 having a flat underside and provided with a recess 17 which opens through the flat side as clearly shown in Figures 3 and 4 of the drawing. The recess 17 is circular in configuration and slidable thereinto is a magnetized block 18 having a flat undersurface 19 and being of a size to receive or magnetic or dielectric cap or shield 20 which is fixedly connected to the block 18 in any suitable manner such as by providing a tight friction fit between the two parts. However, the sides of the shield 20 snugly fit within the side walls of the recess but not tight enough to interfere with the sliding movement of the block.

For the purpose of imparting vertical sliding movement to the block to cause the same to move to a position wholly within the recess 17 or extended slightly beyond the underflat face of the base, I provide rotatable screw rods 21 which are freely turnable in the body 16, and which rods have threaded portions 22 at their inner ends for threading engagement with the threaded sockets 23 provided in the magnetized block 18. The screw portions 22 freely pass through the end wall of the shield 20 as they are only connected to the block 18. The outer free ends of the screw rods 21 are provided with manipulating heads or knobs 24 the hubs of which rest upon the top of the base to coact with the shoulder on the threaded portion 22 to prevent longitudinal movement of the screw rods during turning of the same. In other words, the rods 21 are rotatably mounted in the body 16 for the purpose of moving the magnetized block 18 into and out of the recess 17.

For the purpose of exerting an outward pressure upon the magnetized block 18 and its protecting shield 20, I provide expansion springs 25 which encircle the threaded portions 22 of the rods and which are interposed between the end wall of the recess and the top wall of the shield 20.

In practice, assume that it is desired to test the surface of a piece of work by sliding the base of the instrument thereover, at which time the manipulating heads 24 of the screw rods are turned in one direction so as to retract the magnetic block 18 wholly within the recess 17 and inward of the plane of the underflat face of the base or body 16. In this position, the magnetic influence of the block 18 is unable to interfere with the free sliding of the base at such time as it is necessary to use the instrument in such manner. However, should it be desired to place the base of the instrument upon the work so that it will remain stationary therewith, the manipulating knobs 24 are turned in an opposite direction so as to feed the block 18 outwardly of the base so that the underflat face 19 thereof is disposed beyond the plane of the underside of the base as shown in Figure 3 of the drawing. Under such conditions the magnetic action between the magnetized block 18 and the magnetizable material from which the work is constructed will cause a bond to be formed between the base and the work whereupon the indicator may remain in a fixed or stationary position. In such position the operator has free use of his hands for the performance of such duties as may be necessary in the making of a test.

It might be mentioned that the dielectric shield is to shield the block 18 from the base 16, in order that the said block is free for movement to the various adjustable positions.

While I have shown what I deem to be the most desirable embodiment of my invention, it will be understood that various changes in construction may be made if desired and I do not limit myself to the exact details shown nor to anything less than the whole of my invention limited only by the appended claims.

Having thus described my invention, what I claim as new, and desire to secure by Letters Patent, is:

1. An instrument base of the class described comprising a body having a recess opening through the flat underside thereof, a magnetized block slidable within said recess and provided with a flat outer face, means for shielding said magnetized block from the walls of said recess, and manipulating means for sliding said block to a position wholly within said recess or to a position with the flat outer face beyond the plane of the flat underside of said body.

2. An instrument base of the class described comprising a body having a recess opening through the flat underside thereof, a magnetized block slidable within said recess and provided with a flat outer face, means for shielding said magnetized block from the walls of said recess, and manipulating means for sliding said block to a position wholly within said recess or to a position with the flat outer face beyond the plane of the flat underside of said body, said manipulating means including screw rods freely mounted in said body and threaded to said block, and manipulating heads on the outer free ends of the respective screw rods.

3. An instrument base of the class described comprising a body having a recess opening through the flat underside thereof, a magnetized block slidable within said recess and provided with a flat outer face, means for shielding said magnetized block from the walls of said recess, manipulating means for sliding said block to a position wholly within said recess or to a position with the flat outer face beyond the plane of the flat underside of said body, said manipulating means including screw rods freely mounted in said body and threaded to said block, and manipulating heads on the outer free ends of the respective screw rods, and expansion springs acting upon said block to urge the same outwardly of said recess.

4. In a test indicator base having a recess in the underside thereof, a magnetized block, a magnetic shield fixed to said magnetized block for shielding the same from the walls of said recess to allow the block to freely move therein, and mainpulative means for imparting sliding movement to said magnetized block to position the same wholly within said base for extending the same therefrom.

5. In a test indicator base having a recess in the underside thereof, a magnetized block, a magnetic shield fixed to said magnetized block for shielding the same from the walls of said recess to allow the block to freely move therein, and manipulative means for imparting sliding movement to said magnetized block to position the same wholly within said base or for extending the same therefrom, and expansion springs interposed between the end wall of said recess and said magnetic shield.

6. In a test indicator base having a recess in the underside thereof, a magnetized block, a magnetic shield fixed to said magnetized block, for shielding the same from the walls of said recess to allow the block to freely move therein, manipulative means for imparting sliding movement to said magnetized block to position the same wholly within said base or for extending the same therefrom, said manipulative means including a pair of rotatable screw rods turnably mounted in said base and threaded to said magnetized block, and manipulating heads on the outer free ends of said screw rods.

7. In a test indicator base having a recess in the underside thereof, a magnetized block, a magnetic shield fixed to said magnetized block for shielding the same from the walls of said recess to allow the block to freely move therein, manipulative means for imparting sliding movement to said magnetized block to position the same wholly within said base or for extending the same therefrom, said manipulating means including a pair of rotatable screw rods turnably mounted in said base and threaded to said magnetic block, and expansion springs encircling said screw rods and interposed between said insulating shell and the end wall of said recess.

In testimony whereof I affix my signature.

LEO P. BOUCHER.